United States Patent
Buzek (10) Patent No.: US 12,282,927 B2
(45) Date of Patent: *Apr. 22, 2025

(54) USER PROVISIONING MANAGEMENT IN A DATABASE SYSTEM

(71) Applicant: ZenPayroll, Inc., San Francisco, CA (US)

(72) Inventor: Laura Buzek, San Francisco, CA (US)

(73) Assignee: ZenPayroll, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,390

(22) Filed: May 23, 2024

(65) Prior Publication Data

US 2024/0311848 A1  Sep. 19, 2024

Related U.S. Application Data

(63) Continuation of application No. 18/320,068, filed on May 18, 2023, now Pat. No. 12,026,726, which is a (Continued)

(51) Int. Cl.
*G06Q 10/105* (2023.01)
*G06F 16/245* (2019.01)
(Continued)

(52) U.S. Cl.
CPC ....... *G06Q 30/0185* (2013.01); *G06F 16/245* (2019.01); *G06F 16/25* (2019.01); *G06N 20/00* (2019.01); *G06Q 10/105* (2013.01)

(58) Field of Classification Search
CPC ...... G06F 16/25; G06F 16/245; G06F 16/337; G06N 20/00; G06Q 30/0185; G06Q 10/105
See application file for complete search history.

(56) References Cited

U.S. PATENT DOCUMENTS 8,572,191 B2 * 10/2013 Bonforte ............... H04L 67/306
709/204
9,936,005 B1    4/2018 Palladino et al.
(Continued)

OTHER PUBLICATIONS

"The Challenges and Benefits of Identity and Access Management." Feb. 24, 2016, 5 pages, [Online] [Retrieved May 8, 2020], Retrieved from the Internet <URL:https://www.f5.com/services/resources/white-papers/the-challenges-and-benefits-of-identity-and-access-management>.

(Continued)

*Primary Examiner* — James E Richardson
(74) *Attorney, Agent, or Firm* — Fenwick & West LLP (57) ABSTRACT

A central database system receives information associated with an employee from an employer. Using this information, the central database system can provision one or more user accounts for the employee, for instance via an API of an account provider. The central database system can use a machine learned model to identify fields of the API and to translate the information associated with the employee based on information requirements associated with the API. When a characteristic of the employee, such as the employee's title, subsequently changes within the central database system, one or more features associated with the user account can be automatically updated in response to the change.

20 Claims, 5 Drawing Sheets

Related U.S. Application Data continuation of application No. 17/743,263, filed on May 12, 2022, now Pat. No. 11,694,214, which is a continuation of application No. 16/869,597, filed on May 8, 2020, now Pat. No. 11,361,323.

(60) Provisional application No. 62/845,203, filed on May 8, 2019.

(51) Int. Cl.
  *G06F 16/25* (2019.01)
  *G06N 20/00* (2019.01)
  *G06Q 30/018* (2023.01)

(56) References Cited

U.S. PATENT DOCUMENTS

| | | |
|---|---|---|
| 2008/0168367 A1 | 7/2008 | Chaudhri et al. |
| 2011/0029620 A1 | 2/2011 | Bonforte |
| 2011/0197254 A1 | 8/2011 | Sallaka et al. |
| 2013/0091171 A1 | 4/2013 | Lee |
| 2017/0213280 A1 | 7/2017 | Kaznady |
| 2018/0165135 A1 | 6/2018 | Bahrami et al. |
| 2018/0210768 A1 | 7/2018 | Dai et al. |
| 2019/0196811 A1 | 6/2019 | Bahrami et al. |
| 2020/0019637 A1 | 1/2020 | Barron-Kraus et al. |
| 2020/0349129 A1 | 11/2020 | Bracholdt et al. |

OTHER PUBLICATIONS

Idaptiv. "Idaptive Delivers Appen Increased Functionality, Improved Productivity, and Simplified Employee Lifecycle Management Thanks to Workday Partnership." Appen Case Study, 2019, 3 pages.

Okta. "HR-Driven IT Provisioning." Jan. 17, 2018, 2 pages.

Onelogin. "Product Datasheet: Human Resources Driven Identity Management: Accelerate Employee Onboarding and Enforce Synchronized Policies Across HR and IT." Mar. 18, 2018, 2 pages.

Oracle. "A Role-Based Approach to Automated Provisioning and Personalized Portals." Jan. 2011, 12 pages, [Online] [Retrieved May 8, 2020], Retrieved from the Internet <URL:https://www.oracle.com/technical-resources/articles/role-based-automated-provisioning.html>.

Rippling. "5 Min Demo." Mar. 31, 2020, [Online] [Retrieved May 8, 2020], Retrieved from the Internet <URL:https://www.youtube.com/watch?v=jf-i61TdCGA&t=15s>.

Rippling. "Rippling Identity & Access Management Overview & Security Whitepaper." May 6, 2020, 22 pages.

United States Office Action, U.S. Appl. No. 17/743,263, Dec. 20, 2022, 29 pages.

\* cited by examiner

Receive, by a central database system, information associated with a set of employees from an employer
510

Accessing a third party system API for use in provisioning user accounts
520

Determining a set of information requirements associated with the accessed API
530

Provisioning, for each of the set of employees, a user account via the third party system by translating the received information associated with the employee based on the set of information requirements
540

Receiving, by the central database system, updated information associated with a subset of the employees
550

In response to receiving the updated information, automatically updating the set of features corresponding to user accounts of the subset of employees based on the updated information
560

FIG. 5

USER PROVISIONING MANAGEMENT IN A DATABASE SYSTEM

CROSS-REFERENCE TO RELATED APPLICATIONS

This application is a continuation of U.S. application Ser. No. 18/320,068, filed May 18, 2023, now U.S. Pat. No. 12,026,726, which is a continuation of U.S. application Ser. No. 17/743,263, filed May 12, 2022, now U.S. Pat. No. 11,694,214, which is a continuation of U.S. application Ser. No. 16/869,597, filed May 8, 2020, now U.S. Pat. No. 11,361,323, which claims priority to U.S. Provisional Application No. 62/845,203, filed May 8, 2019, the contents of which are hereby incorporated by referenced in their entirety.

This disclosure relates generally to database systems, and more specifically to provisioning user accounts in a database environment.

BACKGROUND

Organizations, such as companies employing a number of individuals, often utilizing database entities to manage employee data. Such database entities often store employee data in database systems managed by the database entities. Employers also often require employees to utilize accounts with various third entities, such as cloud service providers, security entities, and the like. The employee data required to provisioning these accounts is often stored with the database entities. Various systems enable the provisioning of user accounts on behalf of employees. However, there is a need to simplify the account provisioning process, and to enable the automatic updating of provisioning user accounts in response to a change in employee information or employer policy.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
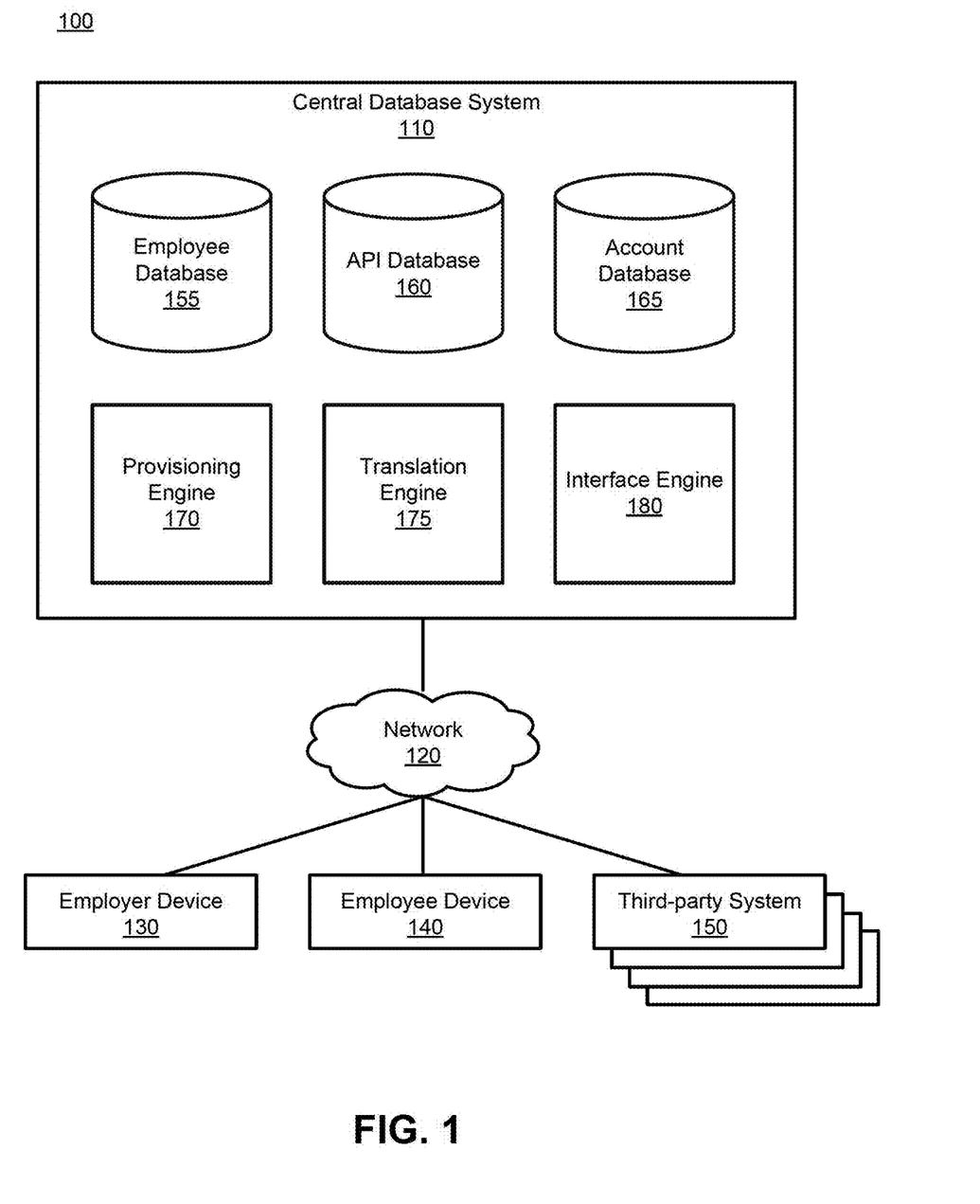
FIG. 1 is a block diagram of a system environment in which a central database system operates, according to one embodiment.

FIG. 1 is a block diagram of a system environment in which a central database system operates, in accordance with an embodiment. The system environment 100 shown by FIG. 1 includes a central enrollment database system 110, a network 120, an employer device 130, an employee device 140, and one or more third-party systems 150. The system environment 100 may have alternative configurations than shown in FIG. 1, including for example different, fewer, or additional components (such as any number of employer devices 130 and any number of employee devices 140).

The employer device 130 and the employee device 140 are one or more computing devices capable of receiving user input as well as transmitting and/or receiving data via the network 120. Examples of computing devices include conventional computer systems (such as a desktop or a laptop computer, a server, a cloud computing device, and the like), client devices (such as smartphones, tablet computers, mobile devices, and the like), or any other device having computer functionality. The employer device 130 and the employee device 140 are configured to communicate with the central database system 110 via the network 120, for example using a native application executed by the employer device 130 or employee device 140 or through an application programming interface (API) running on a native operating system of the employer device or employee device, such as IOS® or ANDROID™. In another example, the employer device 130 and/or the employee device 140 are configured to communicate with the central database system 110 via an API running on the central database system.

As used herein, "employer device 130" refers to a device used by an employer, such as a company, an organization, or any other suitable entity. Likewise, "employee device 140" refers to a device used by an employee, such as an individual hired and employed by an employer. For the purposes of simplicity, the employee corresponding to the employee device 140 is employed by the employer corresponding to the employer device 130 for the remainder of the description herein. However, it should be noted that in practice, the environment 100 can include any number of employee devices and any number of employer devices, and the employees corresponding to the employee devices can be employed by any number of employers corresponding to the employer devices.

The third-party systems 150 are service providers configured to provide user accounts to employees on behalf of employers. For instance, the third-party systems 150 can include email providers, document software providers, cloud service providers, security entities, databases, accounting or financial entities, marketing providers, messaging or communication providers, social networks, image processing or storage entities, file storage providers, credential management providers, device management entities, and the like. Each third-party system 150 can expose an API used to create a user account for instance by providing information required by the API. For instance, a third-party email provider may require the entry of a user's full legal name, employer, age, and phone number within an API of the email provider in order to create an email account for a user. Although not illustrated in the embodiment of FIG. 1, each third-party system 150 is associated with a computing device (such as a server or cloud computer) configured to communicate with the other entities of FIG. 1, and to send and receive data via the network 120.

The central database system 110, the employer device 130, the employee device 140, and the third-party systems 150 are configured to communicate via the network 120, which may comprise any combination of local area and/or wide area networks, using wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The central database system 110 is configured to receive and store various information associated with one or more employees from one or more employers (for instance, via one or more employer devices 130). As described below, the central database system 110 is able to provision user accounts for one or more third-party systems 150 for employees on behalf of employers using the stored information associated with the employees. The central database system 110 can then provide credentials for provisioned user accounts to the employers or directly to the employees associated with the user accounts. When information associated with the one or more employees is updated (e.g., when the central database system 110 receives updated employee information from an employer), the central database system can modify user accounts associated with the one or more employees, for instance by requesting that a feature set associated with one or more user accounts be modified via one or more third-party systems 150 based on the updated information.

In the embodiment of FIG. 1, the central database system 110 includes an employee database 155, an API database 160, an account database 165, a provisioning engine 170, a translation engine 175, and an interface engine 180. It should be noted that in other embodiments, the central database system 110 can include fewer, additional, or different components that those illustrated herein. In addition, in the embodiment of FIG. 1, the central database system 110 is associated with an entity (such as a company or organization) different from the employer associated with the employer device 130, different from the employee associated with the employee device 140, and different from the third-party systems 150. Accordingly, the central database system 110 includes hardware (such as servers, networking equipment, databases or other storage devices, data center systems, and the like) distinct (and in some embodiments, physically remotely from) the employer device 130, the employee device 140, and the third-party system 150.

The employee database 155 is configured to store information associated with one or more employees. This information can be provided by the employer (e.g., via the employer device 130), for instance as part of an employee onboarding process, or can be provided directly by the employee (e.g., via the employee device 140). The employee database 155 can store information associated with each employee in a separate database row or table, or can store information associated with associated employees (such as all employees associated with a particular employer or all employees located in a particular geographic area) together (for instance, within the same table). The employee database 155 can also be modified to update stored information associated with employees. For instance, if an employer indicates that the employee has been promoted to a new position within the employer, the central database system 110 can modify information associated with the title of the employee stored by the employee database 155 to reflect the promotion. Likewise, an employee can indicate to the central database system 110 (either directly or via the employer) that the employee has moved to a new state, and the central database system 110 can modify the stored address associated with the employee in response. It should be noted that the employee database 155 can store information associated with individuals other than employees, such as personnel, staff, organization members, and the like.

Examples of employee information stored in the employee database includes but is not limited to: biographic and demographic information associated with the employees, full legal name and nickname information of the employees, social security numbers, phone numbers, historical information associated with employees (e.g., tenure at a current employer, past employers, past positions or roles, events or milestones associated with the employees, hiring dates, and the like), information describing relationships between employees and employers or other employees, financial data (such as salary information, bonus information, financial transaction information, and the like), personally identifiable information ("PII"), healthcare records, user data or user name data, account data, communication data, social media data, sensor data, dependents information, benefits data, and geographic data (e.g., home address data, work address data, and the like). In some embodiments, the information associated with an employee includes sensitive information that is restricted, such that only authorized users of the central database system 110 or users with particular access permissions may access and/or modify the sensitive information within the employee database 155.

The API database 160 stores information associated with APIs for one of more third-party systems 150. For instance, the API database 160 can include information describing information types required by the APIs of the third-party systems 150, information describing fields and field types associated with the APIs, information describing required formats for information entered into the APIs, and the like. The API database 160 can include information describing a location of the APIs of the third-party systems 150 (e.g., a link to the API, an address of the API, a location with an application of the API, and the like). In some embodiments, the API database 160 stores information describing a structure of the APIs of the third-party systems 150, and in some embodiments, the API database stores information describing a process of provisioning a user account using the APIs (e.g., information describing a series of steps that an API requires to be performed before a user account can be provisioned).

The account database 165 stores information representative of user accounts provisioned on behalf of employees by employers. For instance, for an account provisioned for an employee by an employer, the account database 165 can store an identify of the third-party system 150 associated with the account, a username associated with the account, login credentials for the user account (such as a password or a hash value representative of a security credential), a set of features associated with the user account (such as features of the corresponding third-party system that the employee associated with the user account can access), and the like.

The provisioning engine 170 is configured to enable an employer (via the employer device 130) to provision one or more user accounts on behalf of an employee with one or more third-party systems 150. A user account can be provisioned in response to a request from the employer, for instance a request identifying an employee, identifying a third-party system 150, and identifying a type of account to provision on behalf of the employee. In some embodiments, the provisioning engine 170 can provision a user account in based on an established policy or protocol associated with an employee. For instance, the provisioning engine 170 can provision a cloud email account with a particular third-party system 150 for a particular employer each time a new employee's information is provided by the employer for storage in the employee database 155 (e.g., as part of the employer's new employee onboarding process). In some embodiments, the set of features associated with a provisioned user account (such as the features offered by the third-party system 150 associated with the user account available to an employee associated with the user account) are specified by the employer when request the user account be provisioned, can be selected based on a policy established by the employer (e.g., the set of features available to the user account is selected based on a title of the employee, the access permissions associated with the employee, and the like), or can be a default set of features identified by the employer or the third-party system.

To provision a user with a third-party system 150 on behalf of an employee, the provisioning engine 170 identifies an API corresponding to the third-party system, for instance by accessing API information corresponding to the API from the API database 160. The provisioning engine 170 can identify employee information required by the API from the accessed API information, can access the required employee information associated with the employee from the employee database 155, and can provide the accessed employee information to the third-party system 150 via the API (for instance, by populating fields of the API using the accessed employee information).

Figure 2:
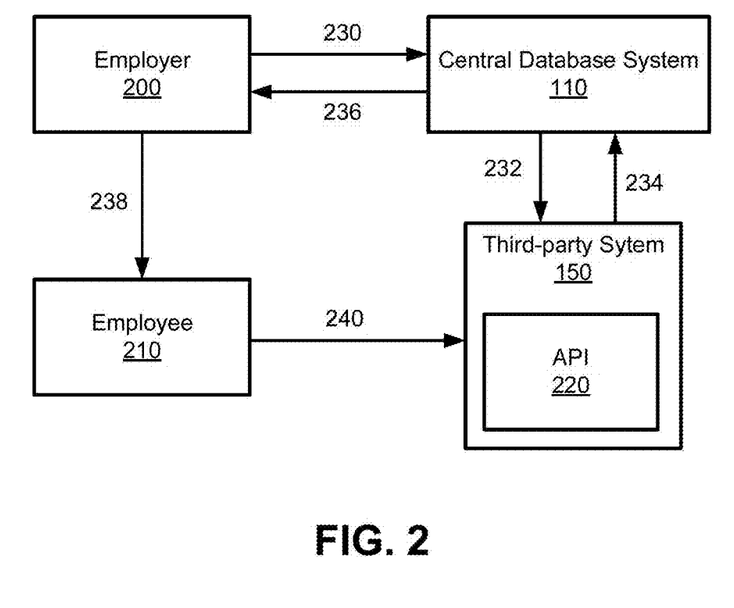
FIG. 2 is an interaction diagram illustrating dataflow between entities of the environment of FIG. 1 in the provisioning of user accounts, according to one embodiment.

FIG. 2 is an interaction diagram illustrating dataflow between entities of the environment of FIG. 1 in the provisioning of user accounts, according to one embodiment. In the embodiment of FIG. 2, an employer 200 requests the provisioning of a user account on behalf of an employee 210 with the third-party system 150 from the central database system 110. In practice, the employer 200 may make such a request using the employer device 130 of FIG. 1 (not illustrated in the embodiment of FIG. 2). The central database system 110, in response to receiving the request 230, provides employee information 232 associated with the employee 210 in conjunction with a request to provision a user account to the third-party system 150, for instance via the API 220 of the third-party system.

The third-party system 150, in response to receiving the request to provisioning the user account and the employee information 232, creates a user account using the employee information 232, and provides information 234 associated with the user account (such as user credentials for the user account, a type of user account, available features associated with the user account, and the like) to the central database system 110.

The central database system 110, in response to receiving the information 234 associated with the user account, stores the information and provides the user credentials 236 to the employer 200. The employer 200 provides the user credentials 238 to the employee 210, and the employee subsequently provides the user credentials 240 to the third-party system 150, for instance while logging into or accessing the user account associated with the employee. Upon being verified via the user credentials, the employee 210 can access one or more features associated with the user account and offered by the third-party system. It should be noted that although the user credentials 236, 238, and 240 all have different reference numbers in the embodiment of FIG. 2, in practice the user credentials may be the same.

In some embodiments, the information requirements of the API used to provision a user account specify a particular type of employee information or a format of employee information in order to provision the user account. In such embodiments, the employee database 155 may not store the necessary type of employee information or format of employee information. The provisioning engine 170 can translate the employee information stored in the employee database 155 in order to satisfy the information requirements of the API using the translation engine 175.

The translation engine 175 is configured to translate information stored within the employee database 155 into a form or format required by an API. In some embodiments, the translation engine performs reformatting operations on data stored in one or more table entries within the employee database 155. For instance, the translation engine 175 can change a format of an employee birthday stored in the employee database 155 for entry into one or more API fields. In some embodiments, the translation engine 175 modifies an entry in the employee database 155 to match an information category accepted by the API. For instance, the translation engine 175 can select a state of residence for entry into an API field based on a zip code of the employee. In some embodiments, the translation engine 175 selects a value accepted by the API based on information stored by the employee database 155. For instance, the translation engine 175 can select an age range from a list of age range options accepted by the API based on a birth date of the employee. In some embodiments, the translation engine 175 performs one or more mathematical operations or other operations on data stored in the employee database 155 based on the information requirements of the API.

Figure 3:
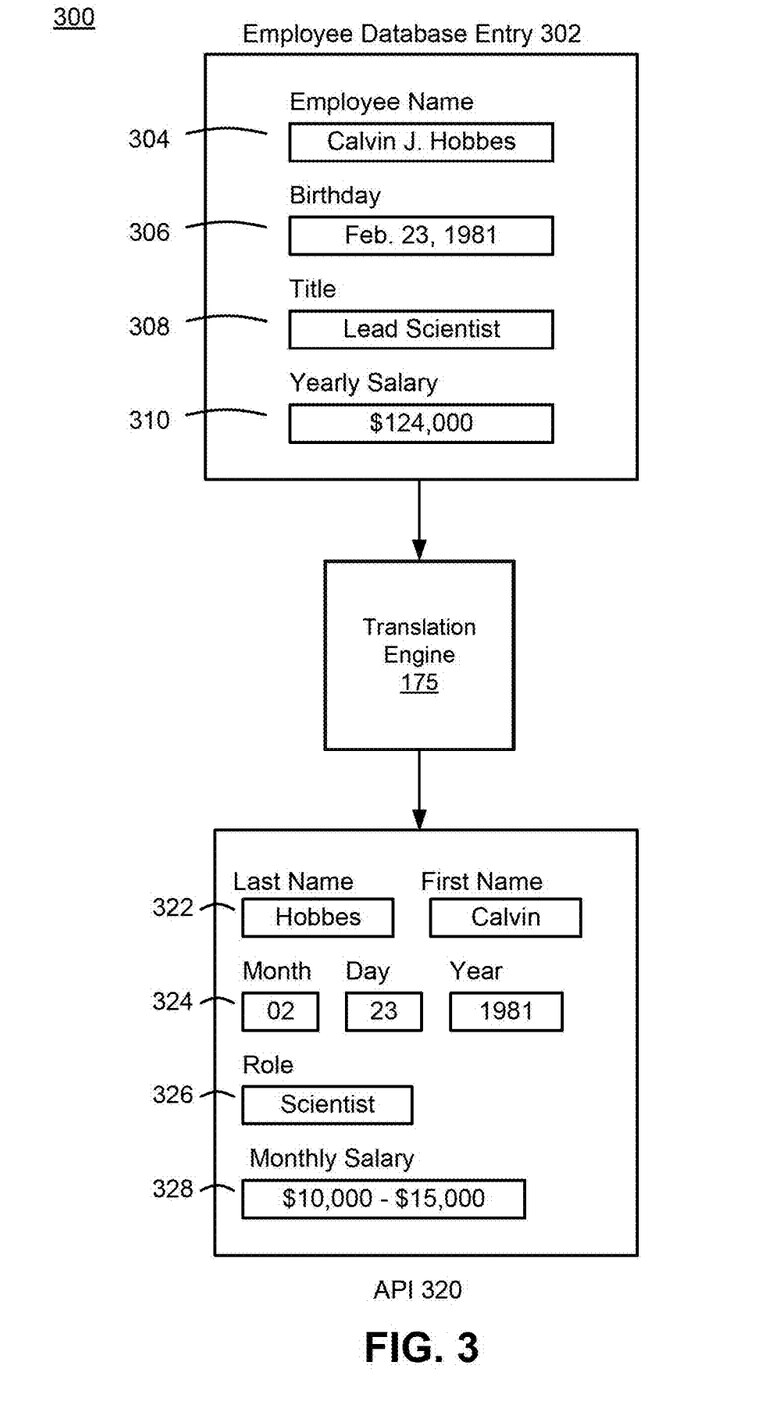
FIG. 3 illustrates an example of data translation in the provisioning of user accounts, according to one embodiment.

FIG. 3 illustrates an example of data translation in the provisioning of user accounts, according to one embodiment. In the embodiment of FIG. 3, an employee database entry 302 includes four entries: an employee name 304, a birthday 306, a title 308, and a yearly salary 310. Likewise, in the embodiment of FIG. 3, the API 320 includes name fields 322 (a last name field and a first name field), birthday fields 324 (a month field, a day field, and a year field), a role field 326, and a monthly salary field 328.

In the embodiment of FIG. 3, the translation engine 175 translates the data string in the employee name entry 304 ("Calvin J. Hobbes") into individual first and last name data strings for entry into the name fields 322. In this example, the translation engine 175 determines that for the employee name "Calvin J. Hobbes", "Hobbes" is the last name and "Calvin" is the first name. The translation engine 175 then enters "Hobbes" in the last name field and "Calvin" in the first name field of the name fields 322. Continuing with the embodiment of FIG. 3, the translation engine 175 formats the birthday "Feb. 23, 1981" from the birthday entry 306 into the value "02" for entry into the month field of the birthday fields 324, into the value "23" for entry into the day field of the birthday fields 324, and "1981" for entry into the year field of the birthday fields 324.

The translation engine 175 translates the title "Lead Scientist" from the title entry 308 to the role "Scientist" for entry into the role field 326. For the role field 326, the API 320 may accept only a limited number of role values or strings, in which case the translation engine 175 selects the most appropriate value or string based on the title entry 308.

For example, the API 320 may only accept the values "Scientist", "Engineer", "Manager", and "Sales" into the role field 326, and the translation engine 175 selects the closest value to the title entry 308 (in this case, "Scientist" is closest among the four acceptable values to "Lead Scientist").

The translation engine 175 translates the yearly salary "$124,000" from the year salary entry 310 into the range "$10,000-$15,000" for entry into the monthly salary field 328. In this embodiment, the translation engine 175 divides the yearly salary value in the yearly salary entry 310 by 12 to determine the monthly salary of the employee (in this case, the monthly salary is ~$10,333). The translation engine 175 then selects among a pre-defined set of monthly salary ranges accepted by the API 320 within the monthly salary field 328. In this case, the translation engine 175 selects the monthly salary range "$10,000-$15,000", and enters it into the monthy salary field 328.

In some embodiments, the provisioning engine 170 trains and applies one or more machine learned models to provision user accounts with the third-party systems 150. The machine learned models can be trained on historical user accounts that are provisioned using APIs of the third-party systems 150 and employee information stored in the employee database 155. For instance, the machine learned models can be trained to identify information requirements associated with such APIs, for instance using natural language processing on text associated with API fields or API program code, identifying types and formats of information entered into API fields during the provisioning of the historical user accounts, and identifying the types and formats of information rejected by the API during the provisioning of the historical user accounts.

The machine learned model can be trained to identify a correlation between information stored in the employee database 155 and information entered into fields of an API of a third-party system 150. For instance, the machine learned model can be trained to identify a relationship between data within a "Full legal name" entry of a table within the employee database 155, and between an API field into which the same or similar data is entered. In such embodiments, the machine learned model can be trained to identify information types of API fields, for instance by determining that the API field is a "Full legal name" field, or simply a "Name" field.

The machine learned model can be trained to identify information translation operations performed on employee information during the provisioning of historical user accounts. For instance, the machine learned model can be trained to identify a form, type, or format of first information stored in the employee database 155, to identify a form, type, or format of corresponding second information entered into one or more API fields (for instance, based on information requirements of the API), and can determine one or more format-changing operations, mathematical operations, combination or separate operation, or any other type of translation operation performed on the first information to convert the first information into the second information.

The machine learned model may be applied to received employee information (or information stored in the employee database 155) to determine a correlation between a portion of the employee information and one or more fields of an API associated with a third-party system 150 through which a user account is to be provisioned. The machine learned model, when applied, may also identify one or more translation operations that need to be performed on the portions of employee information associated with one or more API fields before the employee information can be provided to the API fields. In some embodiments, the machine learned model can identify additional employee information needed before a user account can be provisioned, for instance based on the information requirements of an API. In such embodiments, the provisioning engine 170 can request such information from the employer, from the employee, or can access such information from a different, external entity (such as a social media service, a database of a governmental or other organization, or from any other suitable data source).

In some embodiments, the machine learned model can, after or in response to receiving information associated with one or more employees associated with an employer for storage in the employee database 155, identify one or more third-party systems 150 through which user accounts are likely to be provisioned for the one or more employees. For example, the machine learned model can be trained to identify types of historical user accounts that are provisioned for new employees for a particular employer. The machine learned model may, in response to identifying the one or more third-party systems 150, perform translation operations on the employee information based on the information requirements of the APIs of the identified third-party systems, for instance before the employer requests that user accounts be provisioned for the employees.

In some embodiments, the machine learned model can identify information requirements for an API of a third-party system 150 through which a user account has never been provisioned by the central database system 110. For instance, the third-party system 150 may be a new partner of the central database system 110, may be a new entity (such as a new cloud services provider), or may simply be a third-party system that has never been used by the central database system 110. In such embodiments, the machine learned model can identify fields and corresponding information requirements of the API of the third-party system 150, for instance based on an analysis of API text or code, based on a comparison to similar APIs (APIs from similar sources, APIs with similar text or code, etc.), and the like. The machine learned model can then identify employee information for entry into the identified API fields, can perform translation operations on the employee information based on the identified information requirements of the API fields, and can enter the employee information or translated information into the API fields to provision a user account for the employee. Accordingly, the machine learned model can beneficially enable the provisioning of a user account for a third-party system 150 through which the central database system 110 has never previously provisioned a user account.

The machine learned model can include one or more models, including but not limited to linear support vector machine (linear SVM), boosting for other algorithms (e.g., AdaBoost), neural networks, logistic regression, naïve Bayes, memory-based learning, random forests, bagged trees, decision trees, boosted trees, boosted stumps, a supervised or unsupervised learning algorithm, or any suitable combination thereof.

The provisioning engine 170, when provisioning a user account with a third-party system 150, can specify a set of features associated with the user account. For instance, the provisioning engine 170 can specify a storage capacity for an email account, document editing or sharing features for a cloud word processing account, and spending limits for an online credit account. The set of features can be specified by an employer, can be based on default account settings selected by the provisioning engine 170 or the third-party system 150, or can be based on a characteristic of the employee. For instance, the set of features can be based on a home address of the user, a title or role of the user with the employee, or a set of access privileges associated with the employee. In some embodiments, the set of features associated with a user account can be specified by a policy of the employer which maps features for user accounts associated with each of one or more third-party systems 150 to employee characteristics (such as title or position). The set of features associated with a provisioned user account can be features that the employee can access when the employee uses the user account to interact with the third-party system 150 associated with the user account.

In some embodiments, the set of features associated with the user account can change, for instance in response to a change in employee information associated with the employee corresponding to the user account. For instance, if the set of features associated with a user account is selected based on a title of an employee, then when the title of the employee changes, the set of features associated with the user account of the employee can also change. In some embodiments, the set of features associated with the user account can change automatically, for instance in response to detecting that the employee information stored in the employee database 150 changes or in response to receiving updated information associated with the employee. The set of features associated with a user account can be updated automatically in response to a change in employee information, employer policy, and the like, for instance without requiring a specific request from an employer or specific input by the employee. In some embodiments, changing or modifying the set of features associated with a user account comprises adding features to or removing features from the set of features associated with the user account.

In some embodiments, the set of features associated with user accounts can be changed for multiple user accounts simultaneously. For instance, a request can be received from an employer requesting that all user accounts associated with employees of the employer be updated to include new features, that all user accounts associated with employees associated with a particular title or access privileges have one or more features upgraded, or that all user accounts associated with employees that use the user accounts less than a threshold frequency be downgraded to remove one or more features. In some embodiments, an employer can implement a policy that specifies a set of features based on characteristics of the employees of the employer can be accessed. In such embodiments, the employer can modify characteristics of multiple employees, and in response to the characteristics of the employees being modified, the set of features associated with user accounts corresponding to the employees can be modified based on the policy implemented by the employer. In some embodiments, the employer can modify the policy, for instance by specifying that all employees with a particular title be granted access to a set of features not previously available to employees with the particular title, and in response to the policy being modified, the set of features associated with user accounts corresponding to the employees with the particular title can be modified.

The interface engine 180 coordinates communications between the entities of FIG. 1. For instance, the interface engine 180 receives employee information from the employer device 130, receives requests to provision user accounts on behalf of the employees from the employer device, accesses APIs associated with the third-party systems 150 in order to provision user accounts, provides employee information to the accessed APIs, and provides user credentials to the user accounts to the employer device or the employee device 140. In some embodiments, the interface engine 180 generates and causes display of one or more graphic user interfaces (GUIs), for instance a user of the employer device 130, for a user of the employee device 140, for a user of the central database system 110, or for any other suitable entity.

Figure 4:
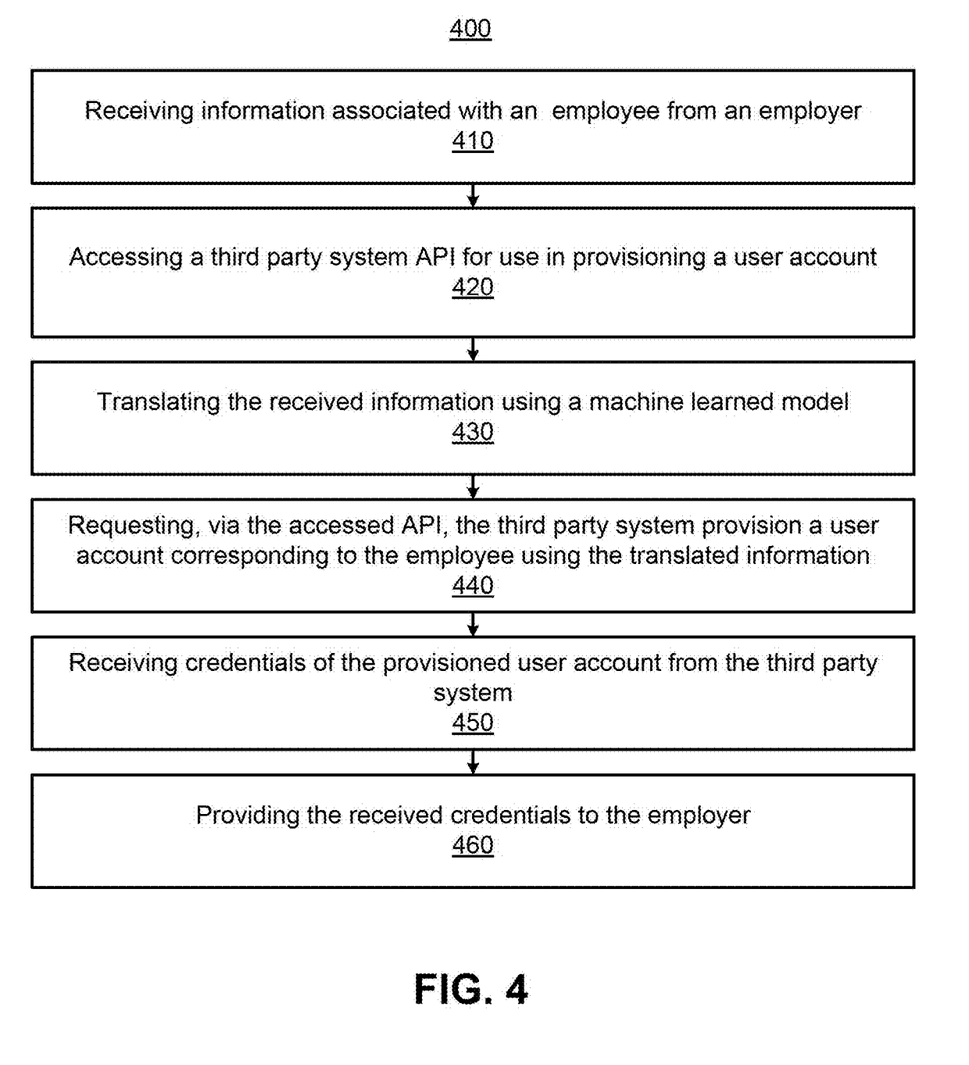
FIG. 4 is a flowchart illustrating a process for provisioning user accounts by a central database system, according to one embodiment.

FIG. 4 is a flowchart illustrating a process 400 for provisioning user accounts by a central database system, according to one embodiment. A central database system receives 410 information associated with an employee from an employer. For instance, the central database system can receive the biographic and/or demographic information representative of an employee, information representative of the employee's employment with the employer, and the like.

The central database system accesses 420 a third-party system API for use in provisioning a user account. For instance, the third-party system can be a cloud email provider that provides a public-facing API for use in provisioning user accounts. The API can be associated with a set of information requirements, for instance detailing a type and format of information required to provision a user account via the API. The central database system can translate 430 the received information using a machine learned model based on the information requirements for entry into fields of the API.

The central database system can then request 440, via the accessed API, that the third-party system provision a user account corresponding to the employee using the translated information. Credentials associated with the provisioned user account (and thus associated with the employee) are received 450 by the central database system from the third-party system, and the central database system can provide 460 the received credentials to the employer.

Figure 5:
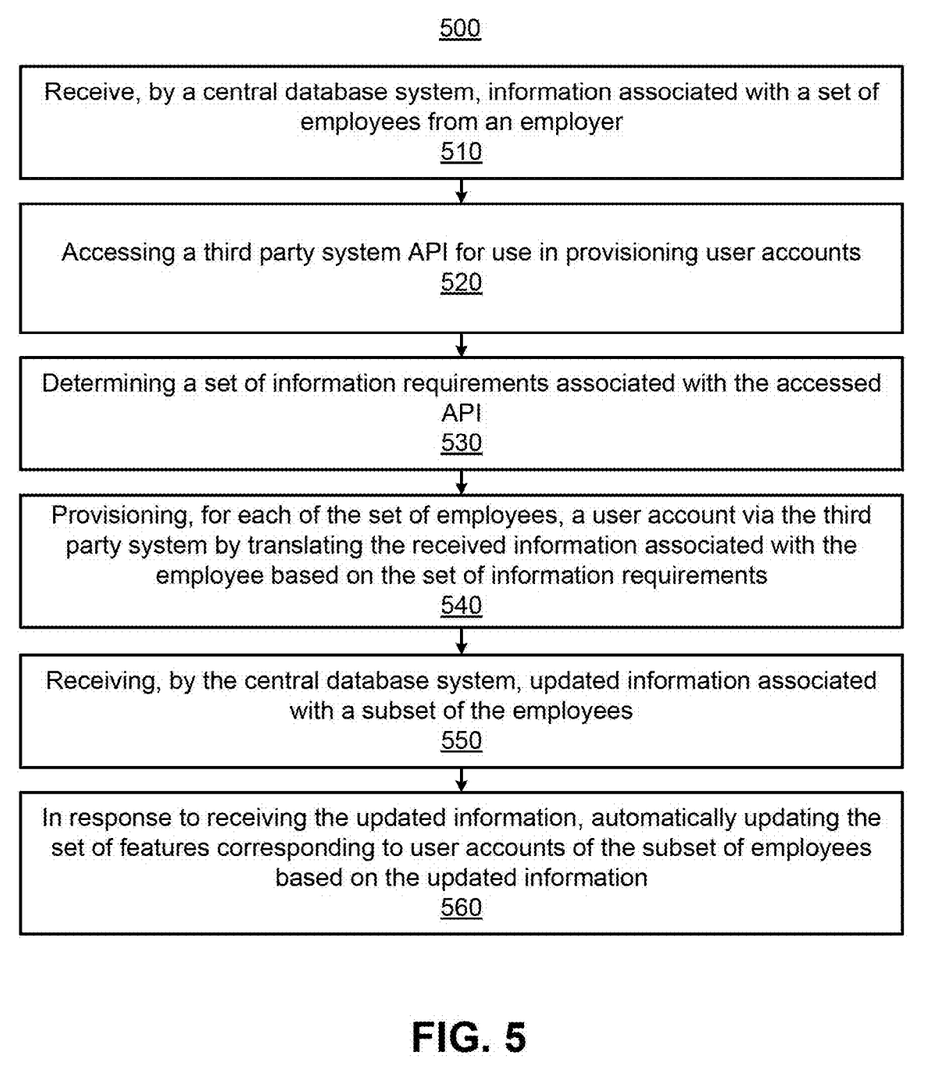
FIG. 5 is a flowchart illustrating a process for automatically updating a set of user accounts in response to a change in characteristics associated with the users associated with the user accounts, according to one embodiment.

FIG. 5 is a flowchart illustrating a process 500 for automatically updating a set of user accounts in response to a change in characteristics associated with the users associated with the user accounts, according to one embodiment. A central database system receives 510 information associated with a set of employees from an employer. For instance, the central database system can receive information describing a title or role of each employee within the organization associated with the employer.

The central database system accesses 520 an API of a third-party system for use in provisioning user accounts for the set of users. The central database system determines 530 a set of information requirements associated with the accessed API, and provisions, for each employee of the set of employees, a user account using the received information and based on the determined set of information requirements. In some embodiments, provisioning a user account includes translating, by the central database system, the received information associated with the employee into a format that satisfies the set of information requirements. Each provisioned user account is associated with a set of features, which may be selected based on characteristics of the corresponding employee.

The central database system subsequently receives 550 updated information associated with a subset of the set of employees. For instance, the central database system can receive information describing an updated title or role for each employee in the subset of employees within the organization associated with the employer. In response to receiving the updated information, the central database system automatically updates 560 the set of features associated with each user account corresponding to the subset of employees based on the updated information. For instance, for a subset of employees that get promoted to a new position within the organization associated with the employer, the user accounts associated with the subset of employees are updated to include access to a new set of features.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing, by an employer database system, a machine-learned model trained using information representative of a historical provisioning of user accounts with one or more third-party systems, the machine-learned model configured to translate employee information to satisfy requirements of third-party system APIs;
accessing, by the employer database system, information associated with an employee;
applying, by the employer database system, the accessed machine-learned model to the accessed information associated with the employee to produce translated employee information; and
provisioning, by the employer database system, one or more user accounts for the employee by providing a portion of the translated employee information to one or more third-party system APIs.

2. The method of claim 1, wherein a user account comprises a cloud services account operated by a third-party system.

3. The method of claim 1, wherein the machine-learned model is trained by identifying fields of APIs associated with the historical provisioning of user accounts, by identifying information associated with employees, by identifying information entered into the identified fields, and by determining a correlation between the information associated with employees and the information entered into the identified fields.

4. The method of claim 3, further comprising determining an information type corresponding to each identified API field and determining a portion of the identified information associated with employees corresponding to the determined information type.

5. The method of claim 1, wherein the machine-learned model is trained to identify one or more information translation operations performed during the historical provisioning.

6. The method of claim 1, wherein the machine-learned model is configured to identify a correlation between a portion of the accessed information and one or more fields of a third-party system API.

7. The method of claim 1, wherein the machine-learned model is configured to identify additional information associated with the employee needed to provision a user account, and wherein the machine-learned model accesses the identified additional information from a source external to the central database system.

8. The method of claim 1, wherein the machine-learned model is configured to identify additional information associated with the employee needed to provision a user account, and wherein the central database system is configured to request the identified additional information from the employer.

9. The method of claim 1, wherein the one or more user accounts are provisioned in response to an employee being onboarded.

10. An employer database system comprising:
a hardware processor; and
a non-transitory computer-readable storage medium storing executable instructions that, when executed by the hardware processor, cause the hardware processor to perform steps comprising:
accessing, by the employer database system, a machine-learned model trained using information representative of a historical provisioning of user accounts with one or more third-party systems, the machine-learned model configured to translate employee information to satisfy requirements of third-party system APIs;

accessing, by the employer database system, information associated with an employee;

applying, by the employer database system, the accessed machine-learned model to the accessed information associated with the employee to produce translated employee information; and provisioning, by the employer database system, one or more user accounts for the employee by providing a portion of the translated employee information to one or more third-party system APIs.

11. The system of claim 10, wherein a user account comprises a cloud services account operated by a third-party system.

12. The system of claim 10, wherein the machine-learned model is trained by identifying fields of APIs associated with the historical provisioning of user accounts, by identifying information associated with employees, by identifying information entered into the identified fields, and by determining a correlation between the information associated with employees and the information entered into the identified fields.

13. The system of claim 12, further comprising determining an information type corresponding to each identified API field and determining a portion of the identified information associated with employees corresponding to the determined information type.

14. The system of claim 10, wherein the machine-learned model is trained to identify one or more information translation operations performed during the historical provisioning.

15. The system of claim 10, wherein the machine-learned model is configured to identify a correlation between a portion of the accessed information and one or more fields of a third-party system API.

16. The system of claim 10, wherein the machine-learned model is configured to identify additional information associated with the employee needed to provision the user account, and wherein the machine-learned model accesses the identified additional information from a source external to the central database system.

17. The system of claim 10, wherein the machine-learned model is configured to identify additional information associated with the employee needed to provision a user account, and wherein the central database system is configured to request the identified additional information from the employer.

18. The system of claim 10, wherein the one or more user accounts are provisioned in response to an employee being onboarded.

19. A non-transitory computer-readable storage medium storing executable instructions that, when executed by a hardware processor, causes an employer database system to perform steps comprising:

accessing, by an employer database system, a machine-learned model trained using information representative of a historical provisioning of user accounts with one or more third-party systems, the machine-learned model configured to translate employee information to satisfy requirements of third-party system APIs;

accessing, by the employer database system, information associated with an employee;

applying, by the employer database system, the accessed machine-learned model to the accessed information associated with the employee to produce translated employee information; and provisioning, by the employer database system, one or more user accounts for the employee by providing a portion of the translated employee information to one or more third-party system APIs.

20. The non-transitory computer-readable storage medium of claim 19, wherein a machine-learned model is configured to translate the information before receiving a request from the employee to provision a user account.

* * * * *